United States Patent Office 3,312,674
Patented Apr. 4, 1967

3,312,674
COPOLYMERS OF A MONOVINYL PHOS-
PHINE OXIDE AND A POLYVINYL PHOS-
PHINE OXIDE
Frank J. Welch, Charleston, W. Va., assignor to Union
Carbide Corporation, a corporation of New York
No Drawing. Filed Sept. 10, 1964, Ser. No. 395,555
3 Claims. (Cl. 260—80.3)

The present invention relates to organic polymerization processes and products, and is especially concerned with an improved process for the polymerization of vinylphosphoryl compounds, i.e., compounds containing the

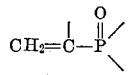

group, whereby high molecular weight, solid polymer products are obtained. The invention is also concerned with certain of the aforementioned polymer products as novel compositions of matter.

More particularly, the polymerizable vinylphosphoryl compounds contemplated by this invention can be represented by the general formula:

(I)     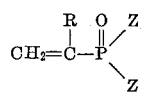

wherein R is either hydrogen or a methyl radical and Z is selected from the group consisting of the —OR', —SR', —N(R')$_2$ and —R' radicals, R' being selected from the group consisting of the saturated and olefinically unsaturated acyclic and cyclic aliphatic and monocyclic aromatic hydrocarbyl radicals containing up to 8 carbon atoms, and in the case of the non-aromatic hydrocarbyl radicals, preferably up to 4 carbon atoms. In addition, the hydrocarbyl radical R' can be substituted by atoms or other radicals which are inert during the practice of this invention, such as halogen atoms, particularly chlorine or bromine atoms, and the like.

Thus, the vinylphosphoryl compounds of this invention include, for instance, the phosphonates of the formula:

(II)    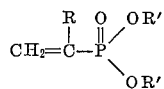

the phosphonodithioates of the formula:

(III)   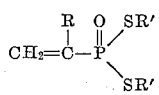

the diamidophosphonates of the formula:

(IV)    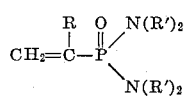

and the phosphine oxides of the formula:

(V)     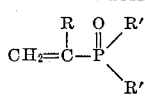

wherein R is hydrogen or a methyl radical and R' is a hydrocarbyl or substituted hydrocarbyl radical as hereinabove defined. By way of illustration, R' can be a linear, branch-chained or cyclic alkyl or haloalkyl radical, such as a methyl, ethyl, n-butyl, isobutyl, hexyl, 2-ethylhexyl, n-octyl, cyclohexyl, 2-chloroethyl or 4-bromobutyl radical, etc.; a linear, branch-chained or cyclic alkenyl radical, such as a vinyl, allyl, isopropenyl, butenyl, octenyl, or cyclopentenyl radical, etc.; an aryl radical, such as a phenyl, tolyl, or xylyl radical, etc.; or an aralkyl radical, such as a benzyl, or phenylethyl radical, etc.

As typical of the vinylphosphoryl compounds which are contemplated by this invention, there can be mentioned.

dimethyl vinylphosphonate
diethyl vinylphosphonate
di-n-butyl vinylphosphonate
diisobutyl vinylphosphonate
dihexyl vinylphosphonate
di(2-ethylhexyl) vinylphosphonate
di-n-octyl vinylphosphonate
dicyclohexyl vinylphosphonate
di(2-chloroethyl) vinylphosphonate
di(4-bromobutyl) vinylphosphonate
diallyl vinylphosphonate
diphenyl vinylphosphonate
ditolyl vinylphosphonate
dibenzyl vinylphosphoate
dimethyl isopropenylphosphonate
diisobutyl isopropenylphosphonate
di-n-octyl isopropenylphosphonate
dicyclohexyl isopropenylphosphonate
di(2-chloroethyl) isopropenylphosphonate
diallyl isopropenylphosphonate
diphenyl isopropenylphosphonate
dibenzyl isopropenylphosphonate
dimethyl vinylphosphonodithioate
diethyl vinylphosphonodithioate
diisobutyl vinylphosphonodithioate
di-n-octyl vinylphosphonodithioate
dicyclohexyl vinylphosphonodithioate
di(2-chloroethyl) vinylphosphonodithioate
diallyl vinylphosphonodithioate
diphenyl vinylphosphonodithioate
ditolyl vinylphosphonodithioate
dibenzyl vinylphosphonodithioate
dimethyl isopropenylphosphonodithioate
diisobutyl isopropenylphosphonodithioate
di-n-octyl isopropenylphosphonodithioate
dicyclohexyl isopropenylphosphonodithioate
di(2-chloroethyl) isopropenylphosphonodithioate
diallyl isopropenylphosphonodithioate
diphenyl isopropenylphosphonodithioate
dibenzyl isopropenylphosphonodithioate
N,N,N',N'-tetramethyldiamido vinylphosphonate
N,N,N',N'-tetraethyldiamido vinylphosphonate
N,N,N',N'-tetraisobutyldiamido vinylphosphonate
N,N,N',N'-tetra-n-octyldiamido vinylphosphonate
N,N,N',N'-tetra(2-chloroethyl)diamido vinyl-
   phosphonate
N,N,N',N'-tetraallyldiamido vinylphosphonate
N,N,N',N'-tetraphenyldiamido vinylphosphonate
N,N,N',N'-tetratolydiamido vinylphosphonate
N,N,N',N'-tetrabenzyldiamido vinylphosphonate
N,N,N',N'-tetramethyldiamido isopropenylphosphonate
N,N,N',N'-tetraisobutyldiamido isopropenylphosphonate
N,N,N',N'-tetra-n-octyldiamido isopropenylphosphonate
N,N,N',N'-tetra(2-chloroethyl)diamido isopropenyl-
   phosphonate
N,N,N',N'-tetraallyldiamido isopropenylphosphonate
N,N,N',N'-tetraphenyldiamido isopropenylphosphonate
N,N,N',N'-tetratolyldiamido vinylphosphonate
dimethylvinylphosphine oxide
diethylvinylphosphine oxide
di-n-butylvinylphosphine oxide
diisobutylvinylphosphine oxide
di-n-octylvinylphosphine oxide
dicyclohexylvinylphosphine oxide
di(2-chloroethyl)vinylphosphine oxide
2-chloroethylmethylvinylphosphine oxide
diallylvinylphosphine oxide
diphenylvinylphosphine oxide ditolylvinylphosphine oxide
dibenzylvinylphosphine oxide
dimethylisopropenylphosphine oxide
diisobutylisopropenylphosphine oxide
di-n-octylisopropenylphosphine oxide
dicyclohexylisopropenylphosphine oxide
di(2-chloroethyl)isopropenylphosphine oxide
diallylisopropenylphosphine oxide
diphenylisopropenylphosphine oxide
dibenzylisopropenylphosphine oxide, and the like.

Moreover, mixtures of vinylphosphoryl compounds or compounds, in which R or R' above is independently selected from the group designated can also be polymerized in accordance with the improved process of this invention.

The vinylphosphoryl compounds contemplated by this invention can be obtained initially in any convenient manner. For instance, the phosphonates represented above by Formula II can be prepared by the reaction of the corresponding phosphoryl dichloride, i.e., the compound of the formula:

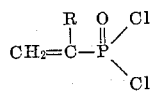

with at least a stoichiometric amount of an alcohol of the formula R'OH, R and R' being as hereinabove defined, in the presence of a basic catalyst. Similarly, the phosphonodithioates represented above by Formula III can be prepared by the reaction of the phosphoryl dichloride with a mercaptan of the formula R'SH; while the diamidophosphonates represented above by Formula IV can be prepared by the reaction of the phosphoryl dichloride with a secondary amine of the formula (R')$_2$NH. On the other hand, the phosphine oxides represented above by Formula V can be prepared by the reaction of a dihydrocarbylchlorophosphine of the formula:

with vinylmagnesium bromide or isopropenylmagnesium bromide, followed by oxidation with peracetic acid, to produce a vinylphosphine oxide or isopropenylphosphine oxide. In this conection, it is also to be noted, that the isopropenylphosphine oxides are considered to be novel compositions of matter.

Although the vinylphosphoryl group,

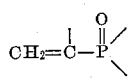

bears some structural similarity to the readily polymerizable acryl group,

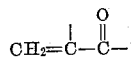

vinylphosphoryl compounds do not readily respond to conventional polymerization techniques. Thus, while copolymers containing minor amounts of vinylphosphoryl compounds together with other polymerizable monomers such as styrene, ethyl acrylate, and butadiene, etc., can be produced readily by standard free radical catalyzed or initiated polymerizations, homopolymers of the vinylphosphoryl compounds are very difficult to prepare using such techniques. In certain instances, by specifically employing the more active free radical catalysts, such as benzoyl peroxide or di-tert-butyl peroxide, etc., significant conversions to a homopolymer product can be obtained at relatively high temperatures above about 100° C. However, the homopolymer products thereby formed are ordinarily low molecular weight oils or tacky gums, while at lower polymerization temperatures or using other free radical catalysts, the rate of polymerization and/or the degree of conversion to polymer is frequently insufficient to warrant comercial application of the process.

Unexpectedly, it has now been found that high conversions of the vinylphosphoryl compounds to normally solid, high molecular weight polymer products can readily be obtained by contacting the monomer, alone or together with a minor amount of a copolymerizable monomer, at a temperature in the range of from about −80° C. to about +100° C. and in an inert atmosphere, with a catalytic amount of an organometallic compound of the formula:

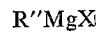

wherein R" is a hydrocarbyl radical as defined above by R'; and X is either a halogen atom, preferably a chlorine, bromine or iodine atom, or the hydrocarbyl radical R". The preferred hydrocarbyl radicals in this regard are the saturated aliphatic and monocyclic aromatic hydrocarbyl radicals, such as the alkyl, aryl and aralkyl radical, etc., while olefinically unsaturated aliphatic hydrocarbyl radicals, such as the alkenyl radicals, etc., are also within the contemplation of this invention.

As typical of the catalysts contemplated by this invention, there can be mentioned:

methylmagnesium chloride
ethylmagnesium bromide
n-butylmagnesium chloride
isobutylmagnesium iodide
2-ethylhexylmagnesium iodide
n-octylmagnesium chloride
cyclohexylmagnesium chloride
vinylmagnesium chloride
allylmagnesium chloride
phenylmagnesium chloride
benzylmagnesium bromide
tolylmagnesium iodide
dimethylmagnesium
diethylmagnesium
diisobutylmagnesium
di-n-octylmagnesium
dicyclohexylmagnesium
divinylmagnesium
diphenylmagnesium
dibenzylmagnesium
ditolylmagnesium, and the like.

In the practice of the polymerization process of this invention, the catalyst and monomer, i.e., the vinylphosphoryl compound, can be brought into contact in any convenient manner, and thereafter maintained at a temperature within the range of from about −80° C., or somewhat lower, to about +100° C., and preferably from about −80° C. to about +50° C., for a period of time sufficient to produce the polymer of this invention. The polymerization period can, in fact, vary broadly, and is readily determinable by one skilled in the art in light of this disclosure. Particularly satisfactory results can be obtained for instance, by carrying out the polymerization for a period of from about 30 minutes to about 24 hours, depending to a certain extent upon the catalyst and monomer concentrations present, as well as upon the polymerization temperature. Moreover, while autogenous pressure is more conveniently employed, the polymerization can also be carried out under increased pressures of up to about 10,000 atmospheres.

Since the rate of polymerization attained by the process of this invention is usually very rapid, it is also preferable to carry out the polymerization in the presence of a suitable inert diluent which is more preferably a solvent for both the catalyst and for the monomer, particularly the former. Thus, while the polymerization process of this invention can be bulk, in which extraneous diluents are absent, an organic suspension or solution polymerization, in which a diluent is incorporated in the reaction mixture is preferably conducted. Suitable diluents include, for instance, hydrocarbons such as toluene, benzene, and methyl cyclohexane, etc.; tertiary amines such as triethylamine, and pyridine, etc.; ethers such as tetrahydrofuran, diethyl ether, and ethylene glycol dimethyl ether, etc.; and the like. To this end, either or both the monomer and the catalyst is best admixed with the diluent prior to their admixture with each other. The diluent thereby aids the transfer of heat evolved during the polymerization. The diluent also serves as a medium for the dispersal of the polymer product, thereby facilitating the agitation of the product during the polymerization, as well as the subsequent recovery of the product.

The amount of catalyst employed can be varied broadly, any catalytic amount thereof being operable. Such amount, it is to be noted, can also readily be determined by one skilled in the art in light of this disclosure. Moreover, particularly good results can be obtained in this connection using catalyst concentrations of from about 0.1 percent, or slightly lower to about 5 percent by weight, based upon the weight of the monomer. Similarly, the concentration of monomer in the total amount of diluent present, when a diluent is employed, can vary broadly, with particularly satisfactory results being obtained using a monomer concentration of from about 10 percent, or slightly lower, to about 50 percent by weight, based upon the weight of the diluent, including any solvent for the catalyst.

In addition, since the catalysts of this invention, in and of themselves, are ordinarily very reactive compounds, it is essential to carry out the reaction in an inert atmosphere so as to avoid contamination of the polymerization system by substances such as air and water which may react with the catalyst and destroy it. Consequently, the monomer, diluent, and reactor to be employed in the polymerization are preferably initially dried and purged with nitrogen or other inert gas, and care is taken to maintain an inert atmosphere during the polymerization.

Upon completion of the polymerization, the polymer product can be recovered in any convenient manner, such as by precipitation upon addition to a liquid which is non-solvent for the product, but which is a solvent for the monomer, as for instance, n-butyl chloride in the case of phosphonate polymers. The polymer product can also be recovered upon stripping off the diluent and any unreacted monomer present.

Unlike the homopolymers of vinylphosphoryl compounds produced by free-radical polymerization techniques, which, as indicated above, generally vary from viscous liquids to tacky gums, the novel homopolymers of this invention are characterized by having increased orientation and stereospecificity, and are ordinarily high-softening, normally solid, i.e., non-tacky, nonflowing products which can be molded into flexible to hard plaques having a high degree of flame resistance as well as resistance to discoloration upon heating. In particular, the polymers produced from the phosphine oxides represented above by Formula V have a softening point above 100° C., and most frequently at least about 150° C., and in addition, evidence a substantial degree of crystallinity. The polymer products of this invention can subsequently be employed to produce molded articles, fibers, films, solid coatings, etc., uses, it is to be noted, which are for the most part precluded for the homopolymers produced by conventional free radical polymerization techniques.

In addition to forming valuable homopolymers, the vinylphosphoryl compounds represented by Formulas I through V can also be copolymerized with a divinylphosphine oxide or trivinylphosphine oxide to produce copolymers which are especially interesting because they generally have higher molecular weights and softening points than the homopolymers. The copolymers containing small amounts of a divinylphosphine oxide or trivinylphosphine oxide, e.g., up to about 3 percent by weight when prepared by means of an organometallic catalyst as described below, and up to as much as about 30 percent by weight when prepared by means of a free radical catalyst, are thermoplastic materials which are soluble in various organic solvents, whereas copolymers containing higher than such amounts of divinylphosphine oxide or trivinylphosphine oxide are highly cross-linked and insoluble in most organic solvents. The thermoplastic type copolymers can be employed in the uses described for the homopolymers of this invention, and the cross-linked, insoluble copolymers can be used as ion-exchange resins to remove metal salts from solutions.

The divinylphosphine oxides and trivinylphosphine oxides which can be copolymerized with the vinylphosphoryl compounds represented by Formulas I through V can be represented by the formula

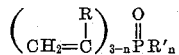

wherein R and R' are the same as in Formulas I through V, and $n$ is an integer having a value of from 0 to 1. Typical of the compounds which can be employed for this purpose are:

trivinylphosphine oxide
triisopropenylphosphine oxide
divinylmethylphosphine oxide
divinylethylphosphine oxide
divinyl-n-butylphosphine oxide
divinylisobutylphosphine oxide
divinyl-n-octylphosphine oxide
divinylcyclohexylphosphine oxide
divinyl-2-chloroethylphosphine oxide
divinylallylphosphine oxide
divinylphenylphosphine oxide
divinyltolylphosphine oxide
divinylbenzylphosphine oxide
diisopropenylmethylphosphine oxide
diisopropenyl-n-butylphosphine oxide
diisopropenylisobutylphosphine oxide
diisopropenyl-n-octylphosphine oxide
diisopropenylcyclohexylphosphine oxide
diisopropenyl-2-chloroethylphosphine oxide
diisopropenylallylphosphine oxide
diisopropenylphenylphosphine oxide
diisopropenylbenzylphosphine oxide, and the like Likewise, mixtures of such compounds or compounds in which R or R' is independently selected from the group designated can also be employed in accordance with the process of the instant invention.

Either a free radical catalyst or the organometallic catalysts described above can be employed in inducing copolymerization. When the latter catalysts are employed, the homopolymerization conditions described above are equally applicable in inducing copolymerization. When a free radical catalyst is employed, the polymerization temperature is suitably maintained within the range of from about 25° C. to about 200° C., preferably from about 80° C. to about 150° C. Among the free radical catalysts which can be employed are oxygen, either alone or together with a trialkylboron, such as trimethylboron, triethylboron and tripropylboron; peroxides such as hydrogen peroxide, diethyl peroxide, dipropionyl peroxide, dilauroyl peroxide, dibutyryl peroxide, dibenzoyl peroxide, distearyl peroxide, di-tertiary-butyl peroxide, tertiary-butyl hydroperoxide, diacetyl peroxide, distearoyl peroxide, acetyl benzoyl peroxide, perbenzoic acid, perlauric acid, and peracetic acid; azo compounds such as α,α'-azo-bis-isobutyronitrile, 2,2' - dicyanoazobenzene and 2,2'-azo-bis(2-methylpropionitrile); percarbonates such as diisopropyl percarbonate and di-tertiary-butyl percarbonate; peresters such as tertiary-butyl perbenzoate and acetaldehyde monoperacetate; persulfates such as sodium persulfate, potassium persulfate and ammonium persulfate; perborates such as sodium perborate, potassium perborate and ammonium perborate; and compounds which together form redox type catalyst systems, such as a combination of ammonium persulfate and sodium bisulfite, or other combinations of oxidizing agents and reducing agents. These catalysts are employed in amounts which are conventionally employed in the art, either individually or in various mixtures thereof. Thus such catalysts can be employed in an amount of from about 0.001 percent by weight to about 5 percent by weight, preferably from about 0.01 percent by weight to about 2 percent by weight, of the total amount of comonomers present. If desired, inert diluents such as water, benzene, toluene, heptane, etc., can be employed in the reaction mixture.

The copolymers of the instant invention are produced from monomeric mixtures which contain from about 0.1 percent by weight to about 99.9 percent by weight, or more, of a vinylphosphoryl compound of Formulas I through V, and from about 0.1 percent by weight to about 99.9 percent by weight of a divinylphosphine oxide or trivinylphosphine oxide. Preferably the mixture contains from about 60 percent by weight to about 99.5 percent by weight of a vinylphosphoryl compound of Formulas I through V, and from about 0.5 percent by weight to about 40 percent by weight of a divinylphosphine oxide or trivinylphosphine oxide.

The copolymers produced by the instant invention can contain from about 0.1 percent by weight to about 99.9 percent by weight, preferably from about 60 percent by weight to about 99.5 percent by weight, of a polymerized vinylphosphoryl compound of Formulas I through V, and from about 0.1 percent by weight to about 99.9 percent by weight, preferably from about 0.5 percent by weight to about 40 percent by weight, of a polymerized divinylphosphine oxide or trivinylphosphine oxide.

The term "reduced viscosity" as used herein defines the value obtained by dividing the specific viscosity of a solution of the polymer by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of N,N-dimethylformamide, at a temperature of 30° C. The reduced viscosity of a polymer, it is to be noted, is conventionally taken by those skilled in the art as a measure of the molecular weight of the polymer, with a higher reduced viscosity value indicating a higher molecular weight product. In this connection, the solid polymers of this invention generally have a reduced viscosity of at least about 0.02.

The term "softening point," as used herein defines the temperature at which a polymer, in powdered form, softens and agglomerates on a melting block, and at which a thin plaque of the polymer can be bent or folded on the melting block without breaking. The softening point of a polymer thus approximates the glass-transition temperature of the polymer, i.e., the temperature at which a characteristic change in physical properties from those of a solid, relatively hard, rigid, and usually glossy polymer to those of a soft, flexible, rubbery polymer occur.

The present invention can be further illustrated by the following specific examples.

EXAMPLE I

A solution containing 26 grams of di(2-chloroethyl) vinylphosphonate in 60 milliliters of anhydrous toluene was placed in a dry 125-milliliter flask. The flask and the contents therein were purged with nitrogen and cooled to a temperature of 0° C., whereupon 5 milliliters of a 3 molar solution of butylmagnesium chloride in diethyl ether were added to the flask in small increments, accompanied by stirring, over a 4-hour period. The reaction mixture was then stirred for an additional hour and poured into about 0.4 liter of n-butyl chloride to precipitate the poly[di(2-chloroethyl) vinylphosphonate] product thus formed. The product was thereafter separated by decantation, washed with n-butyl chloride, filtered, and dried. In this manner, 21 grams of poly[di(2-chloroethyl vinylphosphonate] were obtained as a white solid. The polymer was soluble in dimethylformamide and tetrahydrofuran. A strongly adherent film of the polymer was cast on glass from a dimethylformamide solution. In addition, the polymer was pressed into a flexible plaque at a temperature slightly below 150° C., and evidenced no thermal discoloration at temperatures up to about 250° C.

For comparison purposes, 13 grams of di(2-chloroethyl) vinylphosphonate and 0.1 gram of a conventional free radical catalyst, viz, benzoyl peroxide, were charged to a nitrogen-purged Pyrex tube, which was then sealed and rotated in a water bath at a temperature of 50° C., for 23 hours. The polymer product thus formed was recovered as described above. In this manner, 6.5 grams of poly[di(2-chloroethyl) vinylphosphonate] were obtained as a tacky gum which flowed slowly at room temperature. Thus, the physical properties of this polymer were markedly different from those of the polymer produced by the process of this invention as described above in this example, and were such that the polymer could not be used in molding applications, etc.

EXAMPLE II

A series of experiments were conducted to illustrate the use of various catalysts for the polymerization of di(2-chloroethyl) vinylphosphonate in accordance with the process of this invention. In each run, a 100-milliliter flask was heated to a temperature of about 100° C. under vacuum to remove air and any water present. The flask was purged with nitrogen and cooled to room temperature. A solution of the monomer in a diluent, except where otherwise indicated, was introduced into the flask by nitrogen pressure from a reservoir in which the monomer had been dried by storage over calcium hydride. After the monomer solution was brought to the desired polymerization temperature, a solution of the catalyst was slowly added thereto from a syringe and through an opening in the flask which was sealed with a serum cap. During the addition of catalyst and for a period thereafter, polymerization occurred, and stirring was continually applied to the contents of the flask. Upon completion of the polymerization period, the homopolymeric product thereby formed, i.e., poly[di(2-chloroethyl) vinylphosphonate], was recovered as described above in Example I. The materials and reaction conditions employed are tabulated below in Table A.

TABLE A

| Run | Wt. of Monomer (g.) | Diluent | Catalyst | Temperature, °C. | Total Polymerization Time (hrs.) | Yield (g.) | Reduced Viscosity |
|---|---|---|---|---|---|---|---|
| 1 | 15 | 35 ml. pyridine | 7 ml. of 1 M ethylmagnesium chloride in diethyl ether | −30 | 5 | 12 | 0.14 |
| 2 | 46 | None | 20 ml. of 0.5 M butylmagnesium chloride solution in diethyl ether. | −10 | 0.5 | 20 | 0.15 |
| 3 | 22 | 67 ml. toluene | 7 ml. of 1.4 M phenylmagnesium bromide solution in diethyl ether. | −70 to −50 | 4 | 16 | 0.10 |
| 4 | 19 | 58 ml. toluene | 9 ml. of 1.0 M vinylmagnesium chloride solution in tetrahydrofuran. | −70 | 7 | 13 | 0.09 |
| 5 | 25 | 56 ml. toluene | 4.0 ml. of 0.5 M disbutylmagnesium solution in diethyl ether | −78 | 24 | 13 | 0.24 |

EXAMPLE III

In the manner described above in Example II, 12 grams of diethyl vinylphosphonate in 60 milliliters of tetrahydrofuran were polymerized at a temperature of about −78° C. using 4 milliliters of a 1 molar butylmagnesium chloride solution in diethyl ether as the catalyst. After a polymerization period of 18 hours, the solvent present was evaporated by heating on a steam bath under vacuum. In this manner, about 12 grams of poly[diethyl vinylphosphonate] were obtained as a solid. The polymer had a reduced viscosity of 0.15, and was soluble in dimethylformamide, methanol, benzene and tetrahydrofuran. The polymer was subsequently molded into a flexible plaque at a temperature of 100° C.

EXAMPLE IV

In the manner described above in Example II, 20 grams of diphenyl vinylphosphonate in 60 milliliters of toluene were polymerized at a temperature of about −30° C. using 4 milliliters of a 1 molar butylmagnesium chloride solution in diethyl ether as the catalyst. After a polymerization period of 24 hours, the solvent and unreacted monomer present were removed by distillation under reduced pressure. The polymeric residue was dissolved in acetone, precipitated in diethyl ether, separated by filtration, and dried. In this manner, 3.5 grams of poly[diphenyl vinylphosphonate] were obtained as a solid. The polymer had a softening point of about 100° C. and a reduced viscosity of 0.05. The polymer was subsequently molded into a hard plaque at a temperature of 150° C. In similar manner, diethyl isopropenylphosphonate, and diallyl isopropenylphosphonate are independently polymerized to yield solid, moldable homopolymers.

EXAMPLE V

In the manner described above in Example II, 8 grams of N,N,N′,N′-tetramethyldiamido vinylphosphonate in 25 milliliters of toluene were polymerized at a temperature of about −78° C., using 3 milliliters of a 1 molar butylmagnesium chloride solution in diethyl ether as the catalyst. After 4 hours, the reaction mixture was warmed to room temperature, whereupon the heat evolved during the polymerization caused the temperature to rise to 40° C. The polymer thus formed was precipitated, washed in heptane, separated by decantation and filtration, and dried. In this manner, 8 grams of poly[N,N,N′,N′-tetramethyldiamido vinylphosphonate] were obtained as a solid. The polymer had a softening point above 100° C. and a reduced viscosity of 0.13. The polymer was subsequently molded into a plaque at a temperature of 150° C. In similar manner, N,N,N′,N′-tetrabenzyldiamido vinylphosphonate and N,N,N′,N′-tetraallyldiamido vinylphosphonate are independently polymerized to yield solid, moldable polymers. In contrast therewith, a 45 percent yield of the polymer was obtained as a sticky gum by polymerizing the monomer at a temperature of about 50° C. using a conventional free radical catalyst, viz, 2,2′-azobix(2-methylpropionitrile) as the catalyst.

EXAMPLE VI

In the manner described above in Example II, 11 grams of diethyl vinylphosphonodithioate in 30 milliliters of toluene were polymerized at a temperature of about −78° C. using 2.5 milliliters of a 1 molar butylmagnesium chloride solution in diethyl ether as the catalyst. After a polymerization period of 7 hours, the polymer thus formed was precipitated in butyl chloride, washed with heptane, separated by decantation and filtration, and dried. In this manner, 6 grams of poly[diethyl vinylphosphonodithioate] were obtained as a solid. The polymer had a reduced viscosity of 0.11. The polymer was subsequently molded into a plaque at a temperature of 150° C. In contrast therewith, a twenty percent yield of the polymer was obtained as a viscous oil by polymerizing the monomer at a temperature of about 50° C. using 2,2′-azobis(2-methylpropionitrile) as the catalyst. In similar manner, dibenzyl vinylphosphonodithioate and diallyl vinylphosphonodithioate are independently polymerized to yield solid, moldable homopolymers.

EXAMPLE VII

In the manner described above in Example II, 9 grams of dibutylvinylphosphine oxide in 30 milliliters of toluene were polymerized at a temperature of about −12° C. using 7 milliliters of a 1 molar butylmagnesium chloride solution in diethyl ether as the catalyst. After a polymerization period of 1 hour, the polymer thus formed as a precipitate was separated by decantation, washed with diethyl ether, and dried. In this manner, 8 grams of poly[dibutylvinylphosphine oxide] were obtained as a solid. The polymer had a softening point of about 180° C., a reduced viscosity of 0.14, and was at least partially crystalline as evidenced by X-ray diffraction. The polymer was subsequently molded into a plaque at a temperature of 250° C. In similar manner, dibutylvinylphosphine oxide is polymerized in high yield to a solid, moldable homopolymer independently using the other catalysts described above in Example II.

For comparison purposes, 99 grams of di-n-butylvinylphosphine oxide and 1 grams of di-tert-butyl peroxide were charged to a nitrogen purged flask and heated to a temperature of 150° C. The polymerization reaction was exothermic as the temperature increased to 240° C. The excess monomer was removed by distillation under reduced pressure and the polymer product, a viscous oil, was recovered from the residue by extraction three times with hexane. In this manner, 79 grams of poly[di-n-butylvinylphosphine oxide] were obtained. The product had a reduced viscosity of 0.03 in benzene at 2 percent concentration, and was soluble in benzene, ethyl acetate and acetone. The properties of this polymer were markedly different from those of the polymer produced by the process of this invention as described above in this example, and were such that the polymer could not be used in molding applications. Moreover, di-n-butylvinylphosphine oxide could not be polymerized appreciably with benzoyl peroxide, azobisisobutyronitrile, or other conventional radical initiators at temperatures below 100° C., while at higher temperatures, rates of polymerization are slow, and low yields of polymer are obtained.

EXAMPLE VIII

In the manner described above in Example II, 5 grams of diphenylvinylphosphine oxide in 30 milliliters of tetrahydrofuran were polymerized at a temperature of about 25° C. using 9 milliliters of a 1 molar butylmagnesium chloride solution in diethyl ether as the catalyst. After a polymerization period of one hour, the polymer thus formed as a precipitate was separated by filtration, washed twice with tetrahydrofuran, and dried. In this manner, 5 grams of poly[diphenylvinylphosphine oxide] were obtained as a solid. The polymer had a softening point above 250° C., and a reduced viscosity of 0.06. The polymer was subsequently molded into a plaque at a temperature of about 250° C., and was suitable for use in the production of synthetic textile filbers. In contrast therewith, poly[diphenylvinylphosphine oxide], produced using di-tert-butyl peroxide as a catalyst as described above in Example VII, was recovered as a solid having a softening point of 84° C., thus precluding the satisfactory use of the polymer in the production of synthetic textile fibers. Such use, it is to be noted, ordinarily requires polymers having a softening point above the boiling point of water, and preferably at least in the range of 150° C. to 250° C.

EXAMPLE IX

A solution of 391 grams of isopropenylmagnesium bromide in 2200 milliliters of tetrahydrofuran was cooled to —70° C. To the cooled solution were added 550 grams of diphenylchlorophosphine in a dropwise manner under a nitrogen atmosphere, while not allowing the temperature to rise above —60° C. The resulting mixture was then warmed to room temperature and a solution of 300 grams of ammonium chloride in 2000 milliliters of water was added. The organic layer which separated was extracted with 200 milliliters of water and the combined aqueous layers were extracted with two 200 milliliter portions of toluene. The toluene extracts were combined with the original organic layer and distilled under reduced pressure. All operations were carried out under a nitrogen atmosphere with minimum exposure to air. About 513 grams of crude isopropenyldiphenylphosphine were recovered as a liquid boiling at a temperature of 105–120° C. at 1 millimeter of mercury pressure.

A solution of 503 grams of the crude isopropenyldiphenylphosphine in 500 milliliters of ethyl acetate was cooled to —20° C. under nitrogen and 710 grams of a 24.6 percent solution of peracetic acid in ethyl acetate was added slowly over a period of 1.5 hours. The solution was warmed at 25° C., diluted with 200 milliliters of ethylbenzene, and extracted successively with two 330-milliliter portions of water, 100 milliliters of a 10 percent by weight solution of sodium bisulfite in water, and 200 milliliters of water to remove acetic acid and destroy any unreacted peracetic acid. The organic layer was evaporated under reduced pressure, the residue was dissolved in 500 milliliters of toluene, and the solution was heated at reflux to remove water. The hot solution was filtered and evaporated to dryness, and the residue was distilled rapidly at reduced pressure. A 20-gram forerun having the odor of acetic acid was discarded, and 502 grams of a product boiling at a temperature of 167–175° C. at 0.1 milliliter of mercury pressure were collected. The crude product, which crystallized in the receiver, was dissolved in a refluxing mixture of 450 milliliters of toluene and 600 milliliters of heptane and allowed to cool to room temperature overnight. The crude product was then filtered and the filtrate was evaporated to dryness. The residual oil obtained was crystallized from a mixture of cyclohexane and toluene. A crystalline solid was obtained which was recrystallized from a 1:1 mixture of cyclohexane and cyclohexene to give isopropenyldiphenylphosphine oxide as large platelets. The product had a melting point of 55–56° C.

*Analysis.*—Calculated for $C_{15}H_{15}PO$: C, 74.4; H, 6.3; P, 12.8. Found: C, 74.2; H, 6.3; P, 12.5.

EXAMPLE X

In the manner similar to that described above in Example II, 15 grams of diphenylisopropenylphosphine oxide in 45 milliliters of toluene were polymerized at a temperature of about 25–43° C. using 1.5 milliliters of a 1.0 molar butylmagnesium chloride solution in diethyl ether as the catalyst. After a polymerization period of 2 hours, the polymer thus formed as a precipitate was separated by filtration, washed twice with diethyl ether, and dried under vacuum at 50° C. In this manner, 9.2 grams of poly[diphenylisopropenylphosphine oxide] were obtained as a solid. The polymer had a softening point of 147° C. and a reduced viscosity of 0.051 in ethylene dichloride. In similar manner, diallylisopropenylphosphine oxide and diethylisopropenylphosphine oxide are independently polymerized to yield solid moldable homopolymers.

EXAMPLE XI

Eight (8) grams of di-n-butylvinylphosphine oxide and two (2) grams of divinylphenylphosphine oxide were added to a nitrogen-purged 50-milliliter flask. After the contents of the flask had been heated to a temperature of 70° C., 0.1 gram of di-tertiary-butyl peroxide was added. The resulting mixture was heated at 140–145° C. for four hours. At the end of this time an additional 0.1 gram of di-tertiary-butyl peroxide was added and heating was continued for an additional eight hours. Following this, a final 0.1 gram portion of di-tertiary-butyl peroxide was added and the mixture was heated for five additional hours at 130° C.

The reaction mixture was then dissolved in 25 milliliters of ethylene dichloride, and 800 milliliters of heptane were added to the resulting solution. This caused a copolymer of di-n-butylvinylphosphine oxide and divinylphenylphosphine oxide to precipitate. The copolymer was separated by decantation, washed with heptane, and dried in a vacuum disiccator. Six (6) grams of a white, powdery copolymer were recovered. The copolymer had a reduced viscosity of 0.08 in ethylene dichloride.

EXAMPLE XII

Six (6) grams of di-n-butylvinylphosphine oxide and four (4) grams of divinylphenylphosphine oxide were copolymerized in the manner described in Example XI except that the initial portion of di-tertiary-butyl peroxide catalyst was added at 140° C., causing the temperature to rise spontaneously to 255° C. The resulting copolymer was isolated as in Example XI. Six and one-half (6.5) grams of a white copolymer were recovered. The copolymer had a reduced viscosity of 0.11 in ethylene dichloride and was subsequently molded to a rigid, nonflammable plaque at a temperature of about 120° C.

EXAMPLE XIII

A 250-milliliter flask was heated to a temperature of 110° C. under vacuum to remove air and any water present. The flask was purged with nitrogen and cooled to room temperature. A solution of 24 grams of di-n-butylvinylphosphine oxide and 5 grams of divinylphenylphosphine oxide in 60 milliliters of anhydrous benzene was introduced into the flask by nitrogen pressure from a reservoir in which the monomers had been dried by storage over calcium hydride. After the monomeric solution was brought to the desired polymerization temperature of 25° C., 1.9 milliliters of a 1 molar solution of butylmagnesium chloride in diethyl ether was slowly added thereto with stirring in small increments over a four hour period from a syringe through an opening sealed with a serum cap. Very slight temperature rises accompanied each addition. At the end of the four hour period, an additional 0.7 milliliter of the catalyst solution was added, which caused the temperature to rise to the refluxing temperature of benzene (82° C.). The copolymer of di-n-butylvinylphosphine oxide and divinylphenylphosphine oxide which formed was separated by filtration, washed with heptane, and dried at 50° C. in a forced draft oven. Twenty-eight and two-tenth (28.2) grams of the copolymer were recovered. The copolymer was insoluble in refluxing ethylene dichloride and would not fuse on heating.

EXAMPLE XIV

Four (4) grams of the copolymer prepared in accordance with Example XIII were added to a 100-milliliter buret. The copolymer was saturated with ethanol, causing it to swell to a volume of 22 milliliters.

In order to test the ability of the copolymer to extract salts from solution in organic solvents, 365 milliliters of a 0.10 molar solution of ferric chloride in ethanol was passed through the copolymer over a four hour period. The amount of ferric chloride removed from solution by the copolymer was determined by measuring the concentration of the ferric chloride solution at 15–20 milliliter intervals after it passed through the resin column by means of a Bausch and Lomb Spectronic 20 colorimeter.

A total of 18.7 millimoles of ferric chloride were removed by the four grams of copolymer.

After the resin was saturated with ferric chloride, 305 milliliters of ethanol were passed through the resin column over a 2½ hour period to determine how much salt could be removed by washing with alcohol. It was found that 8.9 millimoles of the salt was removed. Thus 2.45 millimoles of ferric chloride per gram of copolymer was retained after washing.

EXAMPLE XV

Twenty-nine and four-tenth (29.4) grams of di-n-butylvinylphosphine oxide and 0.2 gram of divinylphenylphosphine oxide were copolymerized in 70 milliliters of anhydrous benzene with 4.5 milliliters of a 1 molar solution of butylmagnesium chloride in diethyl ether in the manner described in Example XIII. The resulting copolymer was separated by filtration, dissolved in ethylene dichloride, precipitated by the addition of heptane, filtered, and dried. Eighteen (18) grams of the copolymer were recovered. The copolymer had a softening point of about 110° C., and a reduced viscosity of 0.44 in acetic acid. The copolymer has subsequently molded into a transparent, nonflammable, rigid plaque at a temperature of 150° C. The reduced viscosity and solubility of the resin were unaffected by molding.

EXAMPLE XVI

Fifteen (15) grams of di-n-butylvinylphosphine oxide were polymerized in 110 milliliters of anhydrous benzene with 2.4 milliliters of a 1 molar solution of ethylmagnesium chloride in diethyl ether in the manner described in Example XIII. Several temperature increases were caused by the catalyst additions, with the highest temperature obtained being 45° C.

Eight hundred (800) milliliters of hexane were then added to the reaction mixture, causing the precipitation of poly(di-n-butylvinylphosphine oxide). The product was separated by filtration and dried. Seven and one-half (7.5) grams of the product were recovered. The product had a soften point of about 187° C., and a reduced viscosity of 0.25 in ethylene dichloride. The polymer was subsequently molded into a transparent, nonflammable plaque at a temperature of 200° C.

This application is a continuation-in-part application of application Ser. No. 206,151, entitled, "Polymerization of Vinyl Phosphoryl Compounds," filed June 29, 1962.

What is claimed is:

1. The solid, moldable copolymer of a vinylphosphoryl compound of the formula:

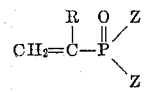

wherein R is selected from the group consisting of hydrogen and the methyl radical, and Z is selected from the group consisting of the —SR', and —R' radicals, R' being selected from the group consisting of the saturated aliphatic and monocyclic aromatic hydrocarbyl and halogen-substituted hydrocarbyl radicals containing up to 8 carbon atoms, with a compound selected from the group consisting of divinylphosphine oxides and trivinylphosphine oxides of the formula:

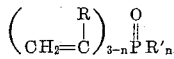

wherein R and R' are as above defined, and $n$ is an integer having a value of from 0 to 1.

2. The solid, moldable copolymer of a phosphine oxide of the formula:

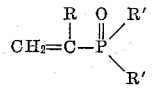

wherein R is selected from the group consisting of hydrogen and the methyl radical, and R' is selected from the group consisting of the saturated aliphatic and monocyclic aromatic hydrocarbyl and halogen-substituted hydrocarbyl radicals containing up to 8 carbon atoms, with a compound selected from the group consisting of divinylphosphine oxides and trivinylphosphine oxides of the formula:

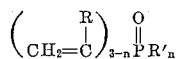

wherein R and R' are as above defined, and $n$ is an integer having a value of from 0 to 1, said copolymer having a softening point above 100° C.

3. The solid, moldable copolymer of di-n-butylvinylphosphine oxide and divinylphenylphosphine oxide, said copolymer having a softening point above 100° C.

References Cited by the Examiner
UNITED STATES PATENTS

| | | | |
|---|---|---|---|
| 3,035,096 | 5/1962 | Cooper | 260—606.5 |
| 3,043,821 | 7/1962 | Coover et al. | 260—80 |
| 3,064,053 | 11/1962 | Rabinowitz | 260—606.5 |
| 3,142,663 | 7/1964 | Niebergall | 260—80 |

FOREIGN PATENTS 1,234,456  10/1960  France.

OTHER REFERENCES

Tselten et al., Vysohomolekulyarnye Soedineniya 3, pp. 1117–81, See C.A. 1962 p. 2568.

JOSEPH L. SCHOFER, *Primary Examiner.*

L. WOLF, W. HOOVER, *Assistant Examiners.*